Feb. 19, 1952 M. A. BRUN ET AL 2,586,298
DISTRIBUTING DEVICE FOR THE CHARGE OF SHAFT FURNACES
Filed July 15, 1948 5 Sheets-Sheet 1

INVENTORS
MAX A. BRUN AND
LEON F. SAUVAGE
BY *Stevens, Davis, Miller & Mosher*
ATTORNEYS Feb. 19, 1952 M. A. BRUN ET AL 2,586,298
DISTRIBUTING DEVICE FOR THE CHARGE OF SHAFT FURNACES
Filed July 15, 1948 5 Sheets-Sheet 2

INVENTORS
MAX A. BRUN AND
LEON F. SAUVAGE
BY
ATTORNEYS

Feb. 19, 1952     M. A. BRUN ET AL     2,586,298
DISTRIBUTING DEVICE FOR THE CHARGE OF SHAFT FURNACES
Filed July 15, 1948                    5 Sheets-Sheet 4

INVENTORS
MAX A. BRUN AND
LEON F. SAUVAGE

BY *Stevens, Davis, Miller & Mosher*

ATTORNEYS

Feb. 19, 1952    M. A. BRUN ET AL    2,586,298
DISTRIBUTING DEVICE FOR THE CHARGE OF SHAFT FURNACES
Filed July 15, 1948    5 Sheets-Sheet 5

INVENTORS
MAX A. BRUN AND
LEON F. SAUVAGE
BY
ATTORNEYS

Patented Feb. 19, 1952

2,586,298

UNITED STATES PATENT OFFICE 2,586,298

DISTRIBUTING DEVICE FOR THE CHARGE OF SHAFT FURNACES

Max A. Brun, Rombas, and Léon F. Sauvage, Homecourt, France, assignors to Compagnie des Forges et Acieries de la Marine et d'Homecourt (Societe Anonyme), Paris, France, a company of France and Societe Lorraine des Acieries de Rombas (Societe Anonyme), Paris, France, a company of France Application July 15, 1948, Serial No. 38,914
In France July 25, 1947

4 Claims. (Cl. 214—36)

It is known that the run of a shaft furnace depends, in an important way, on the distribution in the furnace of loaded materials; particularly, in blast-furnaces, the coke consumption, the quantity and the quality of the obtained pig-iron may vary between large limits according to the way in which the successive charges are distributed.

In known blast-furnaces, this distribution is generally obtained through an invariable distributing device, made of either a charging bell, or a stationary distributing cone. However the charge distribution not only depends on the distributing device, but is also affected by different variable factors such as the physical condition, and dimensions, of the materials, the weight of charges, their upper level, etc.

In order to obtain, at all times, the best distribution, it is of interest to be able to modify, during the run of the furnace, the effect of these variable factors. For that purpose it has already been proposed to use various charge distributing devices, in order to remove the drawbacks of a stationary distributor. Some of these devices, provided under the bell of the top, are made, either of an horizontal, truncated cone which can be turned upside down by a 180° rotation around an horizontal axle, either of an horizontal ring having in cross-section the shape of a wedge, moving vertically.

According to the position occupied by this ring, the charge is directed towards the center or towards the periphery of the furnace; it is thus possible to obtain two concentric slopes of the fall, instead of only one slope. This possibility of distributing the charges on two concentric zones forms already an improvement by itself but is still insufficient for large diameter furnaces.

It has also been proposed to fit on the lower rim of the bell of the furnace, pivoted members enabling modification of the slope of the peripheric part of this cone, and consequently to direct materials on zones more or less spaced from the axis of the shaft. This device is operated by a set of threaded rods passing through the bell, which should be operated by hand. The difficulty of this operation, the time it requires and the stop of charging which it necessitates are such that it is not possible to often operate the device. Consequently it is not possible to modify the slope of the pivoting members at each charge in order to distribute big pieces and fine parts uniformly in the section of the furnace.

This invention has for its object to provide a simple device capable of being continuously regulated, easily and rapidly operated, for distributing the charges in shaft furnaces, either according to a circular ring having a diameter adjustable at will, or evenly on the section of the furnace. In the case of blast furnaces, said device permits to strive against or to help the formation of backings, to pass easily from one sort of pig iron to another, to meet with incidents during the run, and also to obtain an even distribution of big pieces and fine parts helping the indirect reduction and regularizing the run of the blast furnace.

The apparatus which is the object of this invention comprises a number of movable panels, arranged along a circumference inside the top of the furnace and pivoted on a central holder located underneath the lower part of the bell, said panels being able to be more or less tilted by proper irreversible mechanism, operated from outside, which permits to slope all panels simultaneously, these panels partially overlapping one another in all their positions.

Said pivoting panels form in the top of the furnace a truncated pyramid coaxial with the shaft, the apex angle of which varies with the slope of the panels, so that the charged materials falling on said panels are distributed according to an annulus having a variable diameter. It is then possible to do the desired distribution and to obtain, by an appropriate variation of slope before or during the fall of each charge, the uniform distribution of big pieces and fine parts in the section of the furnace, while getting horizontal layers.

There is an even number of movable panels half of which are plane and able to be tilted by the operating device, and between two following plane panels are inserted dihedral panels the edges of which overlap the edges of two consecutive plane panels whatever be the slope given to said plane panels.

In one embodiment of this invention, the movable panels are moved by a mechanism of connecting rods pivoted, at their ends opposed to the panels, on a sleeve gliding on a column fixed along the axis of the holder, and in which are made guiding slots for the sleeve which is moved vertically by a suitable driving-gear driven either by hand or by power. In a modified form of the device which is more particularly suitable for the mechanical driving of the general arrangement, suppress some parts submitted to great stresses and easily permits a motion of determined amplitude of the panels, thus giving the possibility of distributing in the required way charged materials inside the furnace, the connecting rods controlling the inclination of plane panels are pivoted at the upper end of a vertical column supported along the axis of the furnace on a beam extending diametrally at its upper part, which beam is connected with a proper mechanism which permits to raise or lower it horizontally.

Advantageously the beam is somewhat longer than the diameter of the top, and its ends, confined in two boxes secured to the walls of the top, are hung up on rods passing through the upper wall of said boxes, said arrangement permits to move the beam vertically by a lifting device of any type and thus to impart to the column a vertical motion, in one or another direction, for sloping up and down the panels of the distributing device.

The beam can be made of one or several girders, and the drive of the rods which support it can be obtained by screw-jacks driven mechanically, pneumatically, hydraulically or otherwise, a tight seal, such as a stuffing-box preventing the exit of gas at the points where the rods go through the walls of the boxes.

The driving mechanism is capped with a fixed cone, so that said mechanism is protected against the fall of the charge.

Besides the device, which can be operated before or during the introduction of the charge, easily permits the passage of testing drills which certain known distributing devices do not permit.

Reference is to be had to the accompanying drawings, and it will be understood that the devices shown are only given by way of example and that the actual scope of the invention is determined by the appended claim.

On the drawings, top 1 of the blast-furnace is provided with a stopper of the type called "cup and cone," the bell 2 being attached on a movable cross bar 3 which permits to lower it vertically inside the top when it is desired to introduce the charge contained in bucket 4.

Figure 1:
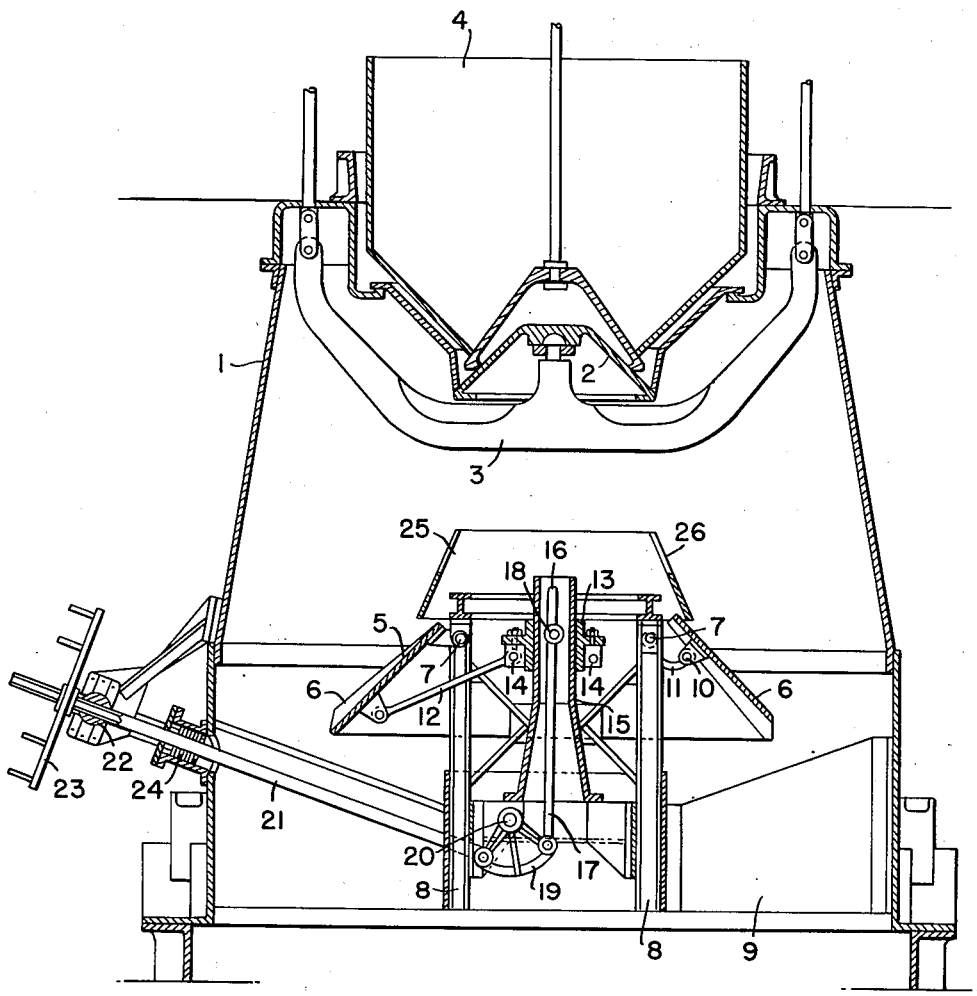
Fig. 1 is a diametral cross-section of the top of a shaft furnace fitted with a device distributing the charges, the panels being raised in order to direct these on the periphery of the furnace.
Figure 2:
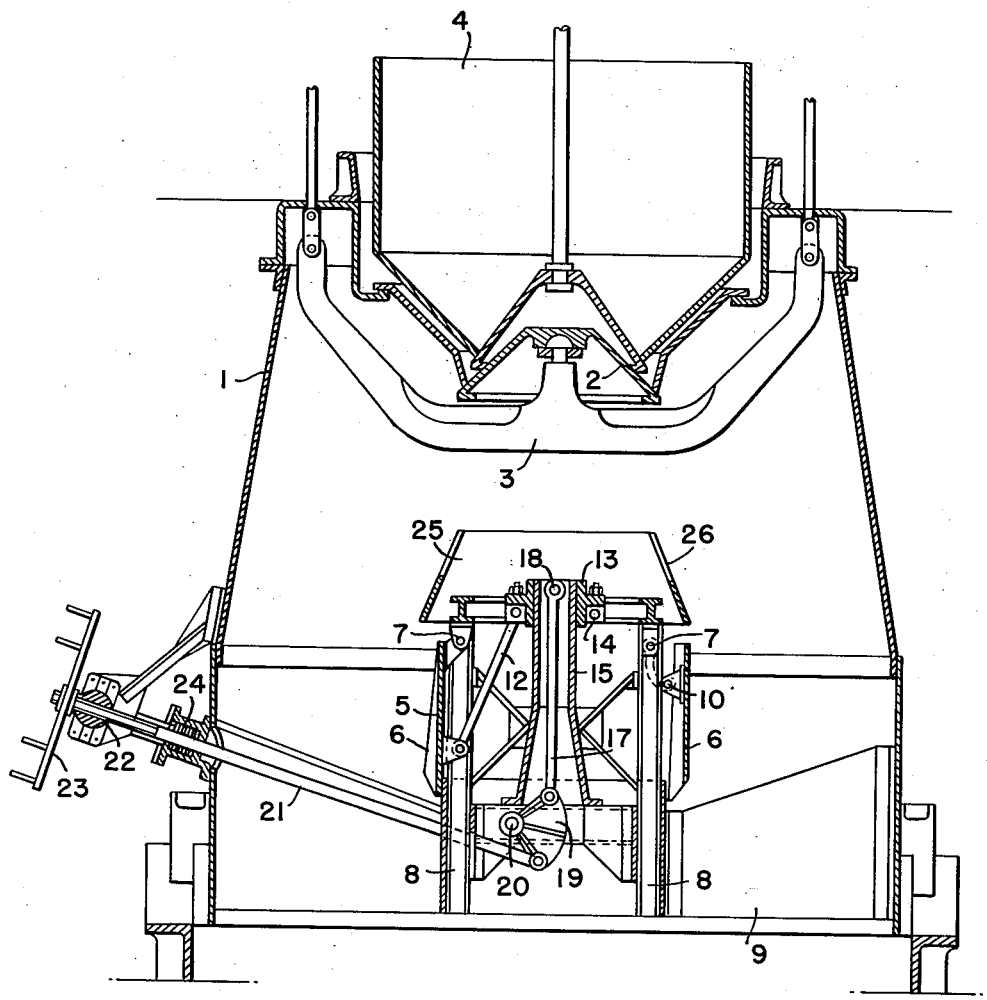
Fig. 2 shows the same device, the panels being entirely lowered in order to let the materials drop on the central part.
Figure 3:
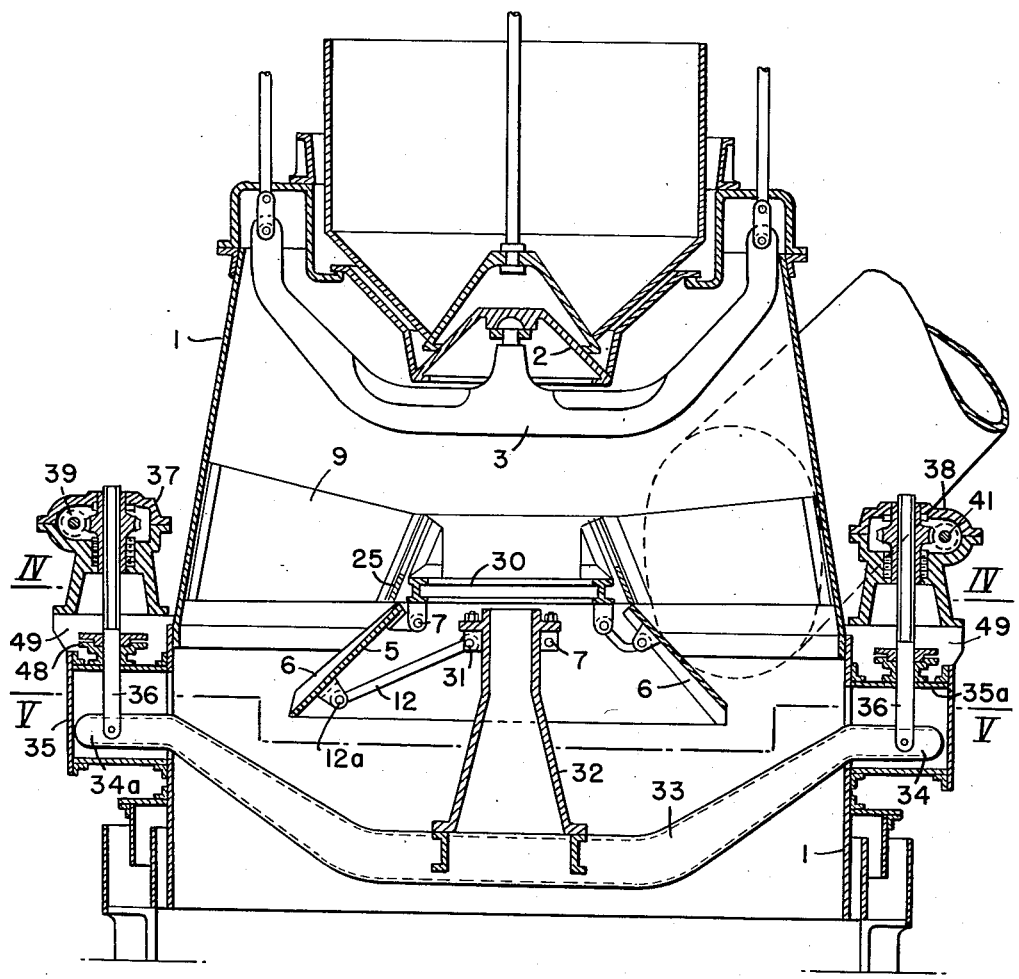
Fig. 3 is a diametrical cross-section, similar to that of Fig. 1, of a shaft furnace provided with another embodiment of the device.

In the embodiment shown on Figs. 1 and 2, the distributing device is located a short distance below the bell 2 and is made of panels of iron plates or of cast steel 5 and 6, the number of which, always an even number, depends on the dimensions of the apparatus. Each of these panels pivots about a pin 7 located at the upper part of the panel, said pin constituting a support and being secured to a stationary frame 8 supported at the center of the top 1 of the blast-furnace, by means of gussets 9 made of sheet iron.

Figure 4:
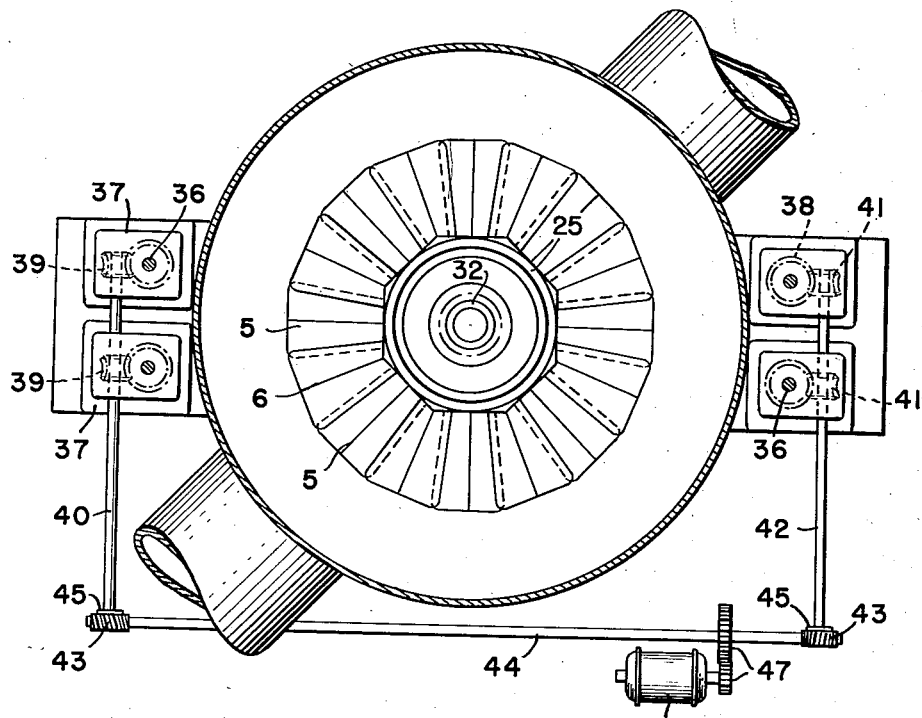
Fig. 4 is a cross-section along IV—IV of Fig. 3.

If the total number of panels is $2n$, the apparatus includes $n$ plane trapezoidal panels 5 and $n$ panels 6, folded according to a dihedral angle, each face of which partially overlaps the contiguous plane panels. Dihedral panels 6 are pivoted at their upper end by a pin 10 on a connecting rod 11, which is pivoted at 7 on frame 8. The double pivoting thus obtained permits the lateral edges of dihedral panels 6, which are set outside of plane panels 5, to bear along all their length on the contiguous plane panels, whatever be the inclination given to said plane panels in the way described hereinafter. The dihedral panels are in turn sloped by the plane panels, and bridge the gap between two contiguous plane panels, hindering pieces of charged material to be jammed in said gap. In the position of minimum opening, the whole arrangement constitutes a regular prism with $n$ faces shown on Fig. 2; when the panels are lifted, the distributing device has about the shape of a regular truncated pyramid, as shown on Fig. 1 and on Fig. 4.

The driving mechanism actuates all the plane panels simultaneously in order to give them, at will, any position comprised between the vertical and a slope of about 45°. For this purpose the lower part of each of these panels is connected with a connecting rod 12 to a sleeve 13 on which the different connecting rods are pivoted by heads 14. In the middle part of frame 8 is set vertically a tubular column 15, cylindrical at its upper part and forming guide for sleeve 13. Two vertical slots 16, diametrically opposed are provided in the wall of column 15, permitting the sleeve to move through a connecting rod 17 the upper part of which is secured to a pin 18 passing through slots 16 and swivelling on sleeve 13.

The lower end of connecting-rod 17 is pivoted on a sector, or bell-crank 19 oscillating on axle 20, set on frame 8. Sector 19 is moved through a driving rod 21 passing through the wall of the top. The end of rod 21 is threaded, and a nut 22, rotatably secured to the top 1 and engaging said threaded end permits to impart to rod 21 longitudinal movements when the hand-wheel 23, integral with nut 22, is rotated. Nut 22 forms a ball fitting in a socket secured on the wall of the top, outside the furnace, said ball permitting rod 21 to incline vertically according to oscillation of sector 19; the passage of said rod through the wall of the top is obtained by means of a labyrinth joint with spherical discs 24 which prevents gas to leak outside.

The device is protected against falling of materials of the charge, by a conical ferrule 25, which is secured at the upper part of frame 8 and of which the large base surrounds the small base of the truncated pyramid formed by the different movable panels. At the upper part of this ferrule, two slots 26 diametrically opposed permit to accommodate the cross bar 3 which supports and drives the bell, so that the bell and ferrule 25 guide the charge of bucket 4 on the set of movable panels 5 and 6 which, according to the given slope of said panels, distribute said charge according to an annulus having a more or less large diameter.

It is easy to understand that this device, easy to build and of which the operation is particularly simple, permits also to accumulate the charges against the walls of the shaft in order to provoke, if required, the formation of backings which are useful to protect the brick work against a too rapid wearing.

It is also conceivable that said device gives still the possibility, by the variation of incination of panels before each charge, or, during the charge by a proper synchronisation of its operation with the lowering of the bell, to evenly distribute in the section of the furnace pieces of various sizes of charged materials and to obtain layers which are about horizontal.

In the embodiment shown on Figs. 3 to 6, the fastening of the device in the furnace is slightly different from that hereinabove described. Fixed pins 7 pivoting the plane panels 5, and the dihedral panels 6, are supported by a stationary circular beam 30 secured to cone 25 protecting the upper part of the device. This cone is supported by brackets 9' secured to wall 1 of the top.

One end of each connecting-rod 12 is pivoted at 12a on one of the plane panel 5, and its other end is pivoted at 31 on the upper part of a vertical column 32 disposed along the axis of the furnace. The different pivotings of the connecting-rods at the top of the column form a regular polygon extending in a horizontal plane.

Figure 5:
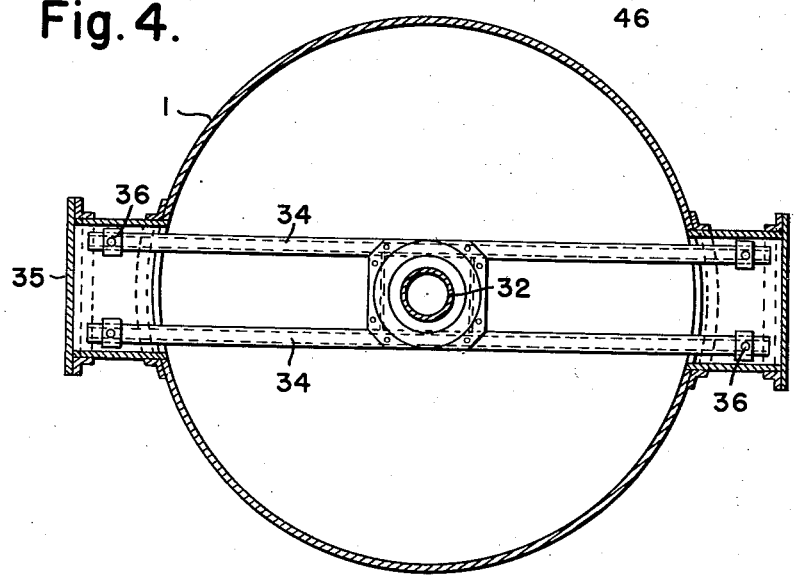
Fig. 5 is a cross-section along V—V of Fig. 3.
Figure 6:
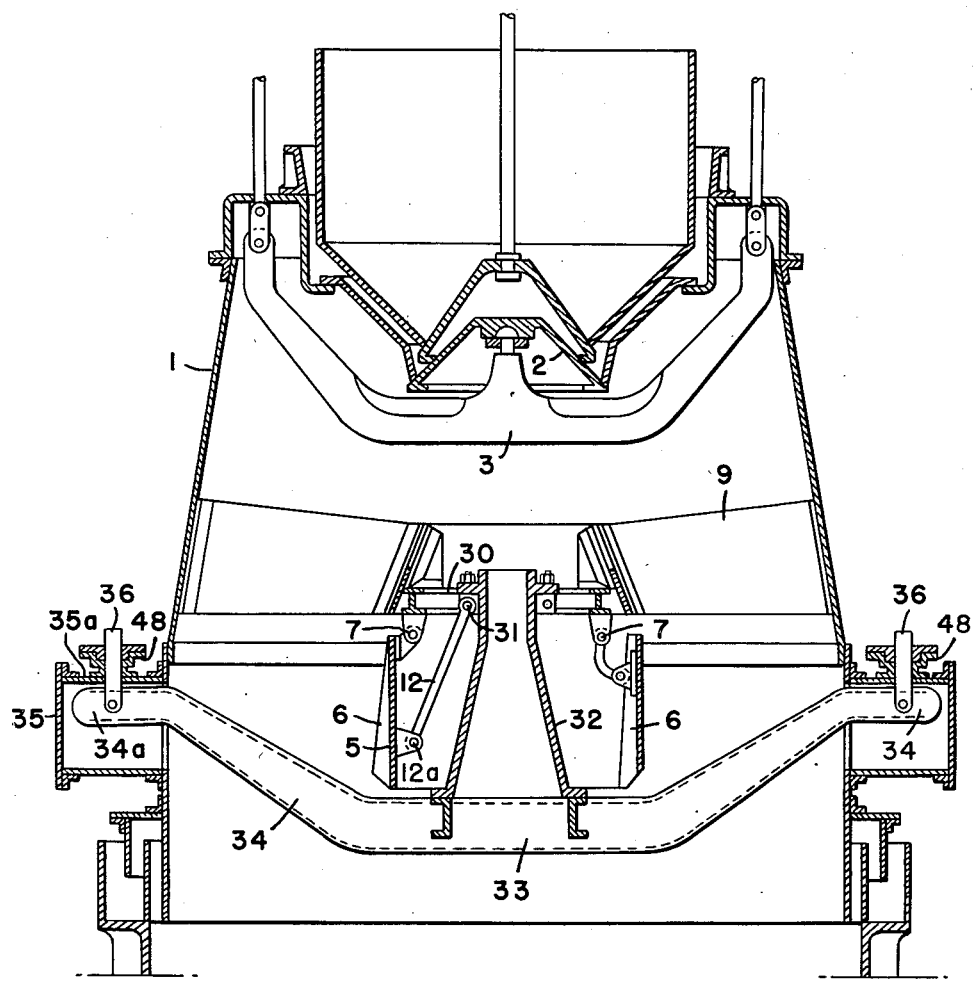
Fig. 6 is a cross-section similar to that of Fig. 3, the panels being shown entirely pulled down.

Column 32 is supported on a beam 33, which on Fig. 5 is made of two horizontal, parallel girders 34, braced together, said beam being adapted to be lifted or lowered. Column 32 is therefore vertically movable, and at each of its positions, corresponds a position of pivoting axles 31, thus a definite slope of the plane panels 5 of the distributing device.

The two girders 34 have a length somewhat longer than the diameter of the top, and their ends 34a are confined in two boxes 35 diametrally secured on the wall of the top. These two girders are hung by their ends 34a at four vertical rods 36 of four identical screw lifting-jacks 37 and 38, supported by proper brackets 49 the rods of these lifting-jacks being driven simultaneously by a single electric motor. For that purpose both worms 39 driving lifting-jacks 37, shown on the left on Fig. 2, are keyed on one shaft 40, and both worms 41 driving lifting-jacks 38, shown on the right of the same figure, are keyed on a second shaft 42 parallel to the first one. On each of these two shafts is keyed a worm-wheel 43, driving them at the same speed through a transverse shaft 44 carrying at its two ends a worm 45. The transverse shaft 44 receives its motion from an electric motor 46 through a set of pinions 47. The lifts of the four lifting-jacks 37 and 38 are thus perfectly balanced at all times, and the two girders 34 are always kept horizontally, whatever be their height.

The four suspension rods 36 pass through stuffing boxes 48, secured on the upper horizontal walls 35a of bores 35, providing a tight joint on passage of said rods and guiding them. This arrangement, while preventing the gas going out untimely, prevents any horizontal displacement of the girders and also their rotation around the vertical axis of the furnace.

Column 32 is thus vertically kept in all its positions, and coaxial with the furnace and the distributing device, and is further prevented from rotating around their common axis. All these conditions are indispensable for the good working of the distributing device.

It is easily understood that it is possible to combine the run of motor 46, hence the motion of panels 5 and 6, with the lowering of cross-bar 3 which, when lowering, allows the charge to fall into the furnace, in such a manner that the panels, when raising distribute the charged materials at larger or smaller distances from the wall of the top.

It is obvious that the electro-mechanical drive of the beam which is described and shown on the figures has been given only as an example, and could be replaced by any other device permitting to lift or to lower simultaneously of the same height the two ends of said beam. According to the resources of the plant, it would be possible to replace the screw lifting-jacks by hydraulic or pneumatic lifting-jacks or by other lifting devices.

It is obvious that it is possible to bring other modifications to the above described distributing device, notably by substituting equivalent technical means, without getting out of the scope of the present invention. Particularly, the beam which has been described as made of two parallel girders, could include only one or, on the contrary more of two. Likewise, these two girders could be connected either at their ends, either inside the furnace. Instead of being parallel, they could form a certain angle between them. One or several lifting devices could be designed at their ends. The beam could also be placed above the movable distributing cone instead of being placed underneath.

What we claim is:

1. Device for the distribution of materials introduced into a shaft furnace provided with a bell, comprising means including a stationary circular beam coaxial with said bell and secured to the top of said furnace through radial brackets, for supporting inside said top an even number of panels located below the lower part of the bell and disposed along a circumference coaxial with the vertical axis of said bell, alternate panels being plane, regularly spaced apart and adapted to be pivoted at their upper part on said supporting means for taking a variable slope, the others of said panels having a dihedral form and being adapted to be pivoted at their upper part on said supporting means for taking a variable slope, their dihedron ridge being adapted to move in a vertical radial plane, said dihedral panels being adapted to overlap partly said plane panels whatever be the slope given to said plane panels, means for controlling from outside the furnace the slope of said plane panels, an elongated horizontal beam extending along a diameter of the top of the furnace and having a greater length than said diameter, both ends of said elongated beam passing through the wall of said top and being confined in lateral boxes diametrically opposed and secured on the outer side of the wall of said top, rods passing through the upper walls of said boxes and adapted to hold up the ends of said elongated beam, a column vertically secured to said elongated beam and coaxial with said top and the bell of the furnace, connecting rods radially disposed connecting each plane panel to said column, each connecting rod being pivoted close to the lower part of one of said panels, and a mechanism for moving up and down said horizontal beam, whereby the slope of said panels is simultaneously modified.

2. Device according to claim 1 in which the top of said column forms a regular polygon and the pivoting pins of said connecting rods are all disposed in a same horizontal plane at the upper part of said column.

3. Device according to claim 1 in which said elongated beam comprises two parallel girders braced together and hung to four parallel rods connected with the ends of each girder, said rods passing through four stuffing boxes secured on the upper walls of said boxes, and being adapted to be moved up and down through four screw lifting-jacks simultaneously operated, whereby said girders are horizontally lifted and lowered.

4. Device according to claim 3 in which the upper ends of said parallel rods are screw-threaded and respectively engaged in a threaded hole provided in a separate worm-wheel, said worm-wheels forming with said threaded rods four screw lifting-jacks, the two jacks cooperating with each end of said elongated beam being coupled through a lateral shaft on which are keyed two worms gearing with said worm-wheels, said lateral shafts being connected through worm-gearings to a transverse shaft actuated by a motor, whereby said four rods are lifted in unison when said motor is running.

MAX A. BRUN.
LÉON F. SAUVAGE.

REFERENCES CITED

The following references are of record in the file of this patent:

UNITED STATES PATENTS

| Number | Name | Date |
| --- | --- | --- |
| 796,784 | Witherbee | Aug. 8, 1905 |

FOREIGN PATENTS

| Number | Country | Date |
| --- | --- | --- |
| 76,328 | Germany | May 10, 1910 |